Nov. 1, 1960 N. C. HEYMAN 2,958,215
SAFETY LOCK
Filed Dec. 3, 1957 6 Sheets-Sheet 1
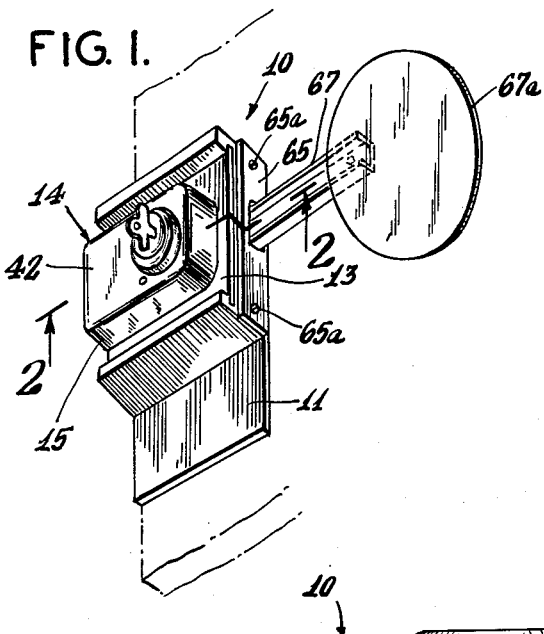
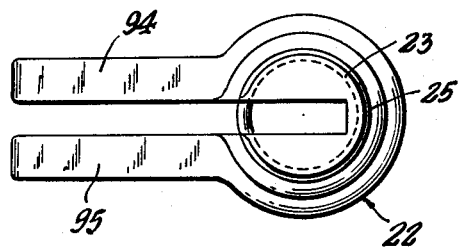
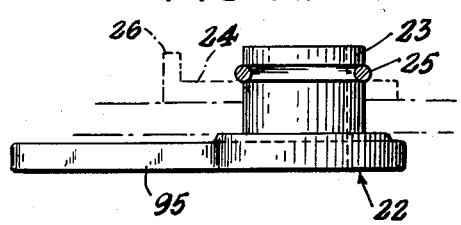
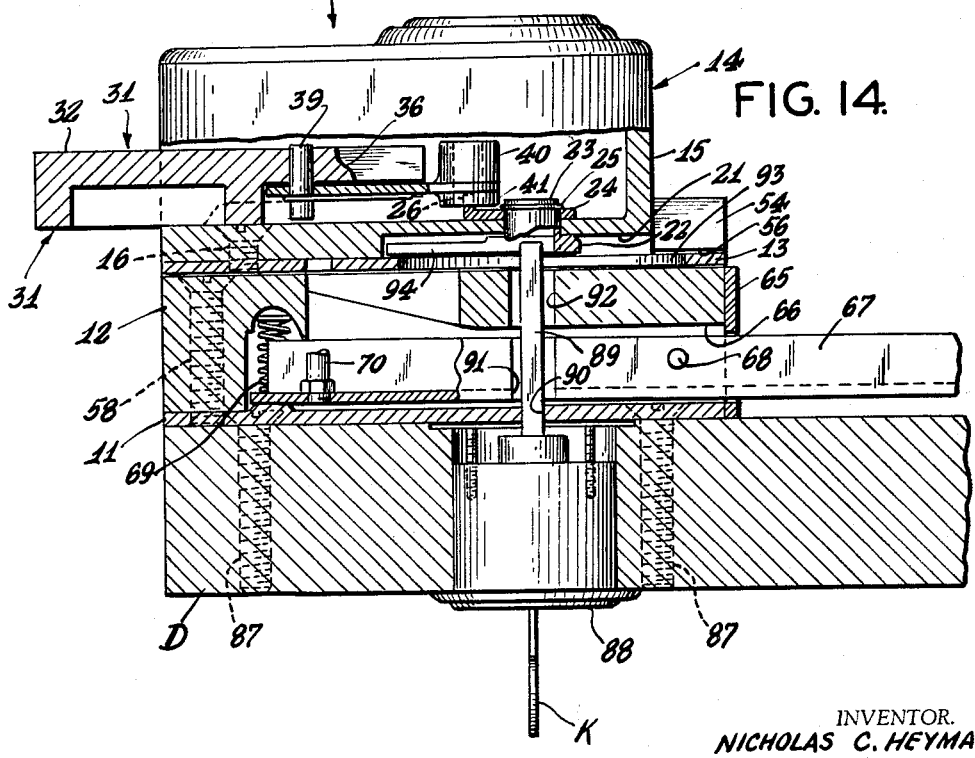
INVENTOR.
NICHOLAS C. HEYMAN
BY
J.B. Felshin
ATTORNEY.

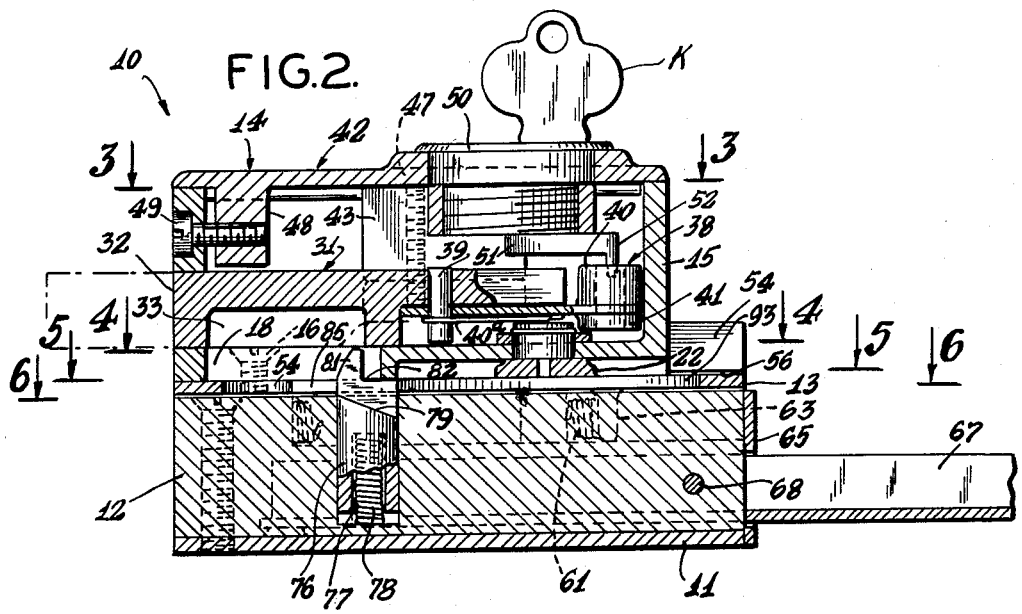
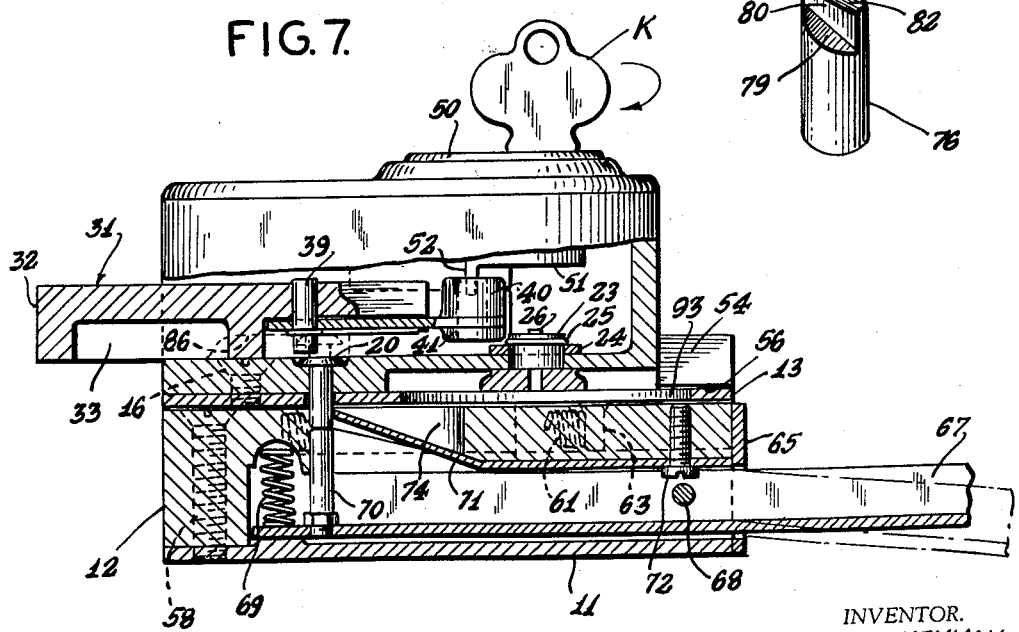

INVENTOR.
NICHOLAS C. HEYMAN
ATTORNEY.

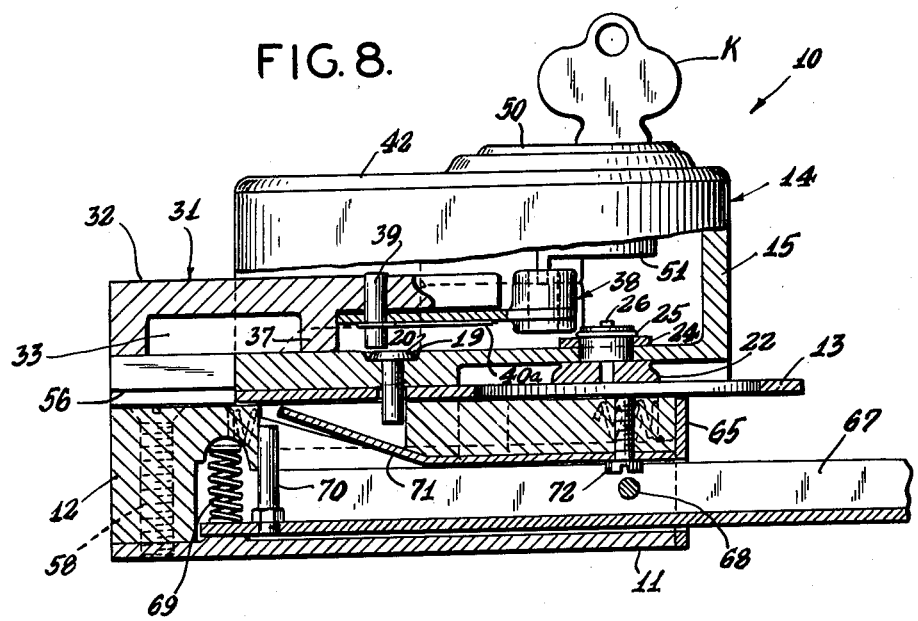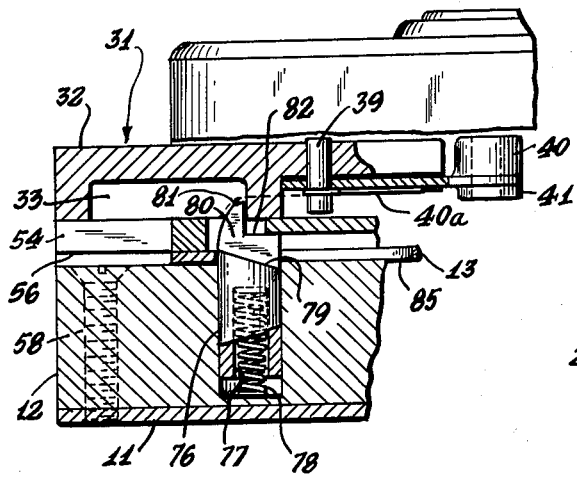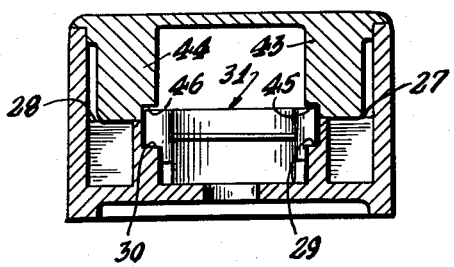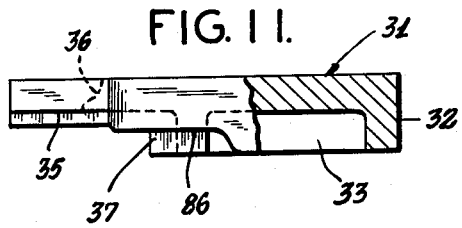

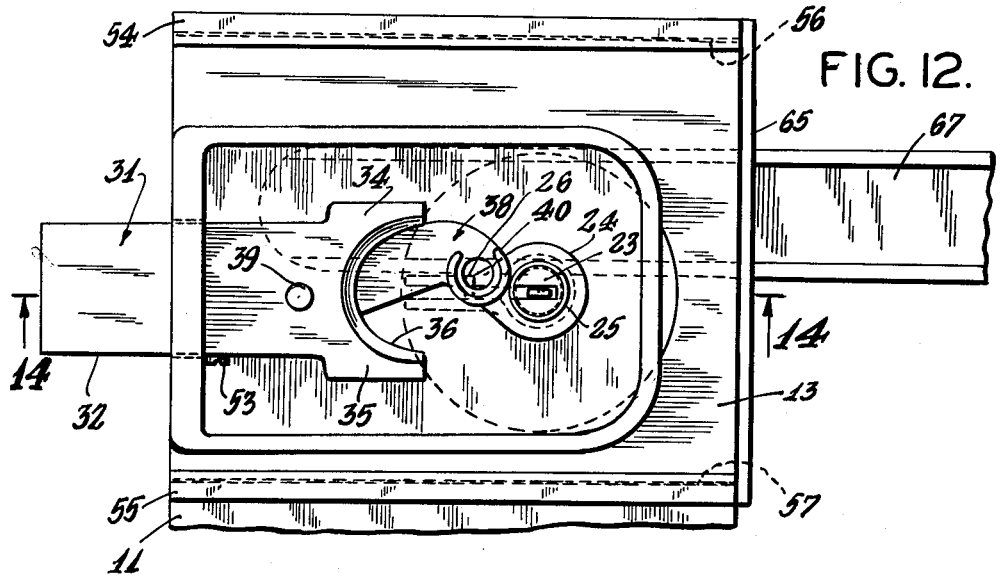
FIG. 12.
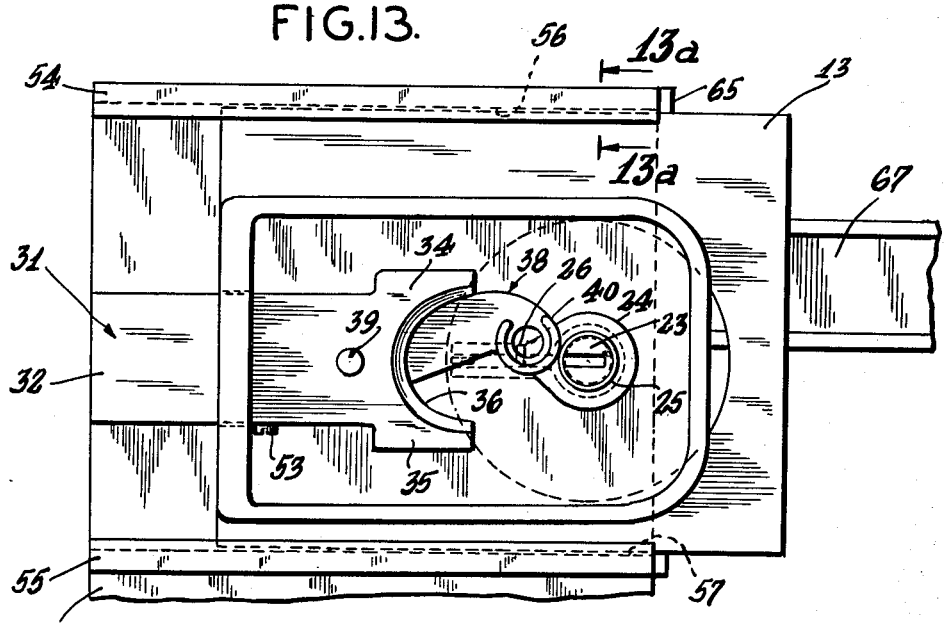
FIG. 13.
FIG. 13a.
INVENTOR.
NICHOLAS C. HEYMAN
BY
ATTORNEY.

United States Patent Office 2,958,215
Patented Nov. 1, 1960

2,958,215

SAFETY LOCK

Nicholas C. Heyman, 1778 E. 17th St., Brooklyn, N.Y.

Filed Dec. 3, 1957, Ser. No. 700,508

25 Claims. (Cl. 70—92)

This invention relates to safety locks and is directed particularly to an emergency fire and exit door lock.

Various state and city departments such as the Labor Department, the Fire Department, etc., designate certain exit doors on public buildings as emergency exit doors. These doors cannot be locked from the inside by any means other than certain approved devices, and must be accessible for exit without the use of any key. These approved devices are known as panic devices and normally keep the door locked, but it can be unlocked by means of a simple push from the inside of the premises.

Approved devices of the above nature now in use are deficient for one or more of the following reasons: (a) exit can be accomplished without the knowledge of the person in charge of the premises and without the knowledge that the premises had been used by an unauthorized person; (b) they are all of the spring bolts design, and thus can readily be forced back or jammed back to keep the door unlocked; and (c) they involve the breaking of glass requiring replacement after emergency use, which is often neglected, whereby the intended locking control is lost.

The principal object of the invention is to provide an improved emergency fire and exit door or panic lock which embodies a dead bolt locking device requiring a standard door key for locking and unlocking, which normally keeps the door locked at all times, and which has a strike plate mechanism on the inside of the door which can be actuated by hand in an emergency to withdraw the entire dead bolt locking device away from the edge of the door and thus out of locked position.

It is another object of the invention to provide an improved safety lock of the character described which, once used for emergency or unauthorized exit, cannot be reset for locking except by use of the same key used for authorized locking or unlocking, thereby bringing to the attention of those in charge of the premises that the door has been used, and putting them on guard against a possible unauthorized use of the door in the removal of valuables.

It is still another object of the invention to provide a safety lock of the character described that is adaptable for use with any type of key, such as an ordinary tumbler lock key, and which is mounted by means of mounting screws normally beneath the dead bolt lock and not accessible, except after emergency release of the lock and concurrent operation of an associated alarm gong or similar warning device.

Another object is to provide an improved safety lock of the above nature which is simple in construction, easy to install and manufacture, foolproof in operation, and long-wearing and efficient in operation.

Other objects, features, and advantages of the invention will be apparent from the following description when read with reference to the accompanying drawing wherein:

Fig. 1 is a perspective view showing an emergency fire and exit door lock according to the invention as seen from the inside of the door;

Fig. 2 is a horizontal cross-sectional view taken along the line 2—2 of Fig. 1 in the direction of the arrows;

Fig. 7 is a cross-sectional view taken along the line 7—7 of Fig. 3 in the direction of the arrows, showing the lock in its normal locking condition and illustrating details of internal construction;

Fig. 8 is similar to Fig. 7 but illustrates the lock in withdrawn position after having been operated for release without a key by striking the strike plate;

Fig. 9 is a partial elevational view, partly in cross-section, illustrating the mechanism for preventing resetting of the released lock without prior withdrawal of the lock bolt by means of the key;

Fig. 10 is a vertical cross-sectional view of Fig. 3 taken along the line 10—10 thereof in the direction of the arrows;

Fig. 11 is a view taken along the line 11—11 of Fig. 3 in the direction of the arrows, showing the lock bolt separately, a portion thereof being broken away to reveal details of internal construction;

Fig. 12 is a plan view of the safety lock with the lock case cover removed, showing the dead bolt in normal locking condition;

Fig. 13 is a view similar to Fig. 12 showing the device in released position after unauthorized or emergency exit;

Fig. 13a is a cross-sectional view of Fig. 13, taken along the line 13a—13a thereof in the direction of the arrows;

Fig. 14 is a vertical cross-sectional view taken along the line 14—14 of Fig. 12 in the direction of the arrows, and illustrating details of the mechanism for unlocking the door by a key from the outside;

Fig. 15 is a perspective view of the reset pin, shown separately;

Fig. 16 is a plan view of the outside locking cam; and

Fig. 17 is an elevational view thereof.

Figure 3:
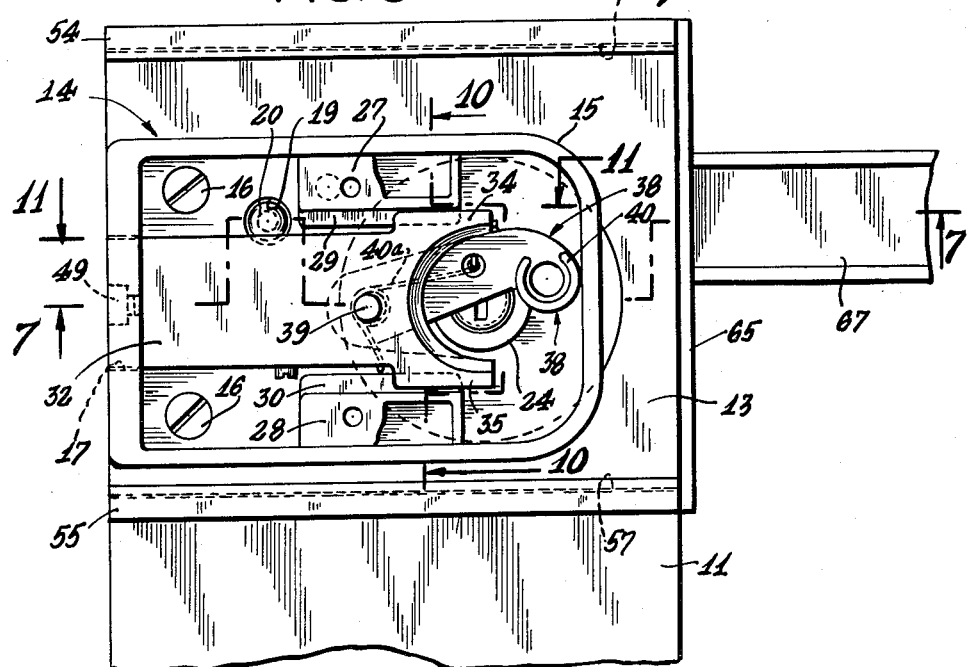
Fig. 3 is a vertical cross-sectional view taken along the line 3—3 of Fig. 2 in the direction of the arrows.

Referring now in detail to the drawings, wherein like reference numerals denote corresponding parts throughout the several views, the numeral 10 denotes the improved safety lock embodying the invention in general. The safety lock comprises a base plate 11, a generally rectangular base member 12 supported thereon, a slide plate 13 slidably arranged with respect to the base member 12, and a dead bolt lock 14 supported upon the slide plate 13 and movable together therewith. The dead lock bolt 14 comprises a generally rectangular box-like housing case 15 which is secured upon the slide plate 13 by means of a pair of machine screws 16 (see Figs. 3 and 4). The housing case 15 is provided in its forward end wall with a rectangular slide bolt opening 17. The housing case 15 is also provided in its bottom wall with a longitudinal slot 18, the purpose of which will be explained hereinbelow, and a counterbored opening 19 within which a headed release pin 20 is slidably fitted. The housing case 15 is provided near the rear end thereof with a cut-out portion or recess indicated at 21 in Fig. 14, within which an outside locking cam 22 is disposed, the neck portion 23 of said cam extending through an opening in the bottom of said housing case. Keyed on the neck portion 23 of the outside locking cam 22 and within the housing case 15 is a bolt actuating cam 24, said bolt actuating cam being held in place thereon by a locking ring 25. The bolt actuating cam 24 is formed with an upwardly projecting finger 26 which is cooperative with the bolt actuating mechanism, as is hereinbelow more fully described.

Figure 4:
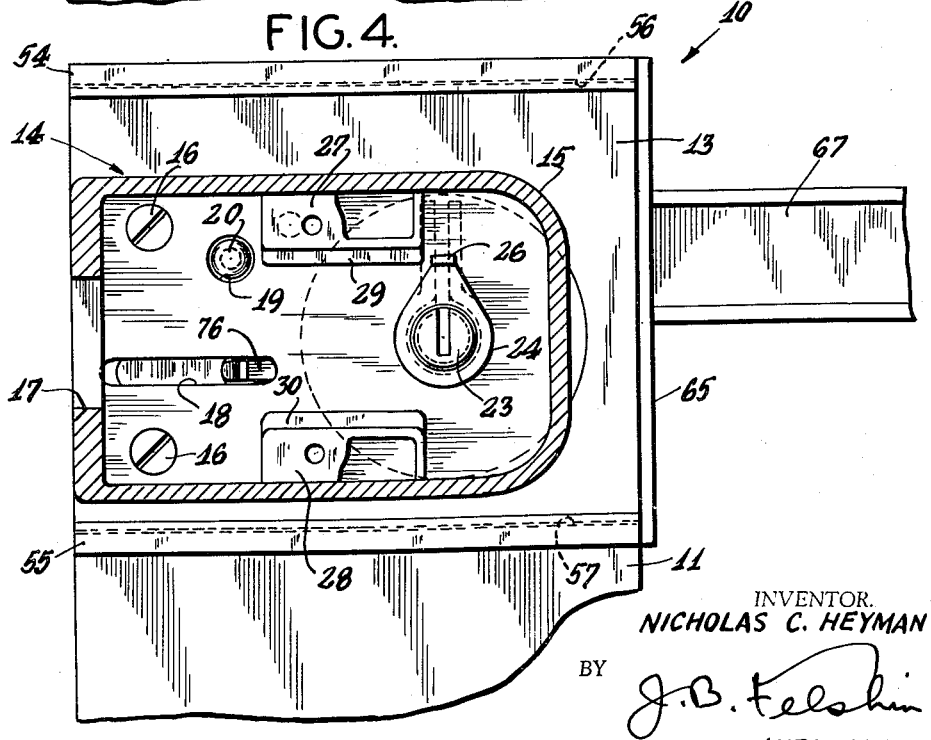
Fig. 4 is a vertical cross-sectional view taken along the line 4—4 of Fig. 2 in the direction of the arrows.

As can best be seen in Fig. 4, the interior of the rectangular housing case 15 is formed at each side with parallel spaced bosses 27, 28 having recessed, opposed slide surface shoulders 29, 30 respectively. Slidably disposed within the housing case 15 is a bolt member 31 having a rectangular lock portion 32 aligned with and adapted to extend through the slide bolt opening 17 in said housing case. The underside of the lock portion 32 of the bolt 31 is provided with a rectangular recess 33. The rear end of the bolt 31 is formed with opposed, sidewardly projecting shoulders 34, 35 the undersides of which are slidably engaged upon the shoulders 29, 30 respectively of the bosses 27, 28. The rear end of the bolt 31 is also formed with a circular recess 36. A recess 37 formed in the underside of the rear end of the bolt 31 provides space within which one end of a bolt lever 38 is pivotally arranged by means of a vertically extending pivot pin 39. A torsion spring 40a operating between the bolt 31 and the bolt lever 38 serves to resiliently hold the bolt lever 38 in its limit position of clockwise rotation with respect to said bolt, as illustrated in Fig. 3. The outer or rearwardly extending end of the bolt lever 38 is formed at its upper side with a semi-cylindrical vertical wall portion 40, and at its underside with a semi-cylindrical lower wall portion 41, for the purpose hereinafter appearing.

The dead bolt lock 14 also comprises a cover 42 formed at its underside with a pair of spaced downwardly projecting bosses 43, 44 having undercut shoulders 45, 46 (see Fig. 10), forming guide surfaces for the upper portions of the shoulders 34, 35 of the bolt 31 when said cover is assembled in place and secured by means of machine screws 47 extending through said cover and into the bosses 27, 28 formed within said housing case. The cover 42 is also provided near its front end with a downwardly extending front boss 48 tapped to receive a securing machine screw 49 extending through a countersunk opening in the front wall of the housing case 15 at a position above the bolt 31 (see Fig. 2).

The cover 42 is fitted with a tumbler lock 50, the rotary barrel of which carries an inside locking cam 51 provided with an actuating finger 52. The finger 52 of the inside locking cam 51 is adapted to enter into the upper semi-cylindrical wall portion 40 of the bolt lever 38 and withdraw the same for unlocking from the dotted line position thereof as illustrated in Fig. 2, and when turned clockwisely, to extend the bolt again into locking position.

As illustrated in Figs. 12 and 13, a machine screw 53 screwed into the side of the bolt 31 limits outward movement of said bolt beyond its fully extended position by coming in contact with the interior surface of the front wall of the housing case 15.

Figure 6:
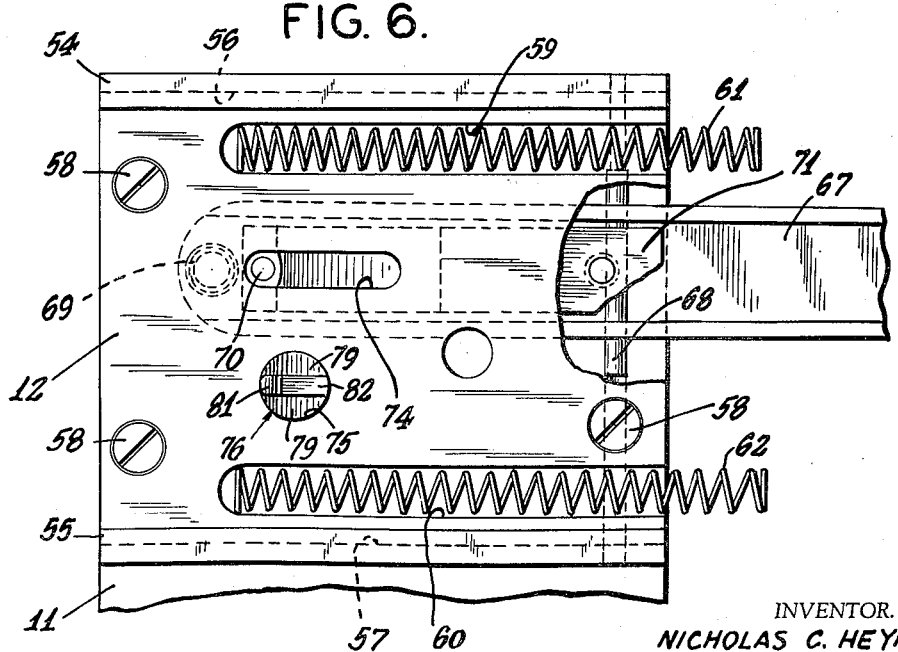
Fig. 6 is a vertical cross-sectional view taken along the line 6—6 of Fig. 2 in the direction of the arrows.

The base member 12 is integrally formed with a pair of upstanding side wall portions 54 having opposed lateral rectangular grooves 56, 57 respectively, within which the lateral edges of the slide plate 13 are guided for reciprocal motion of said slide plate with respect to said base member. As best illustrated in Fig. 6, the base member 12 is secured upon the base plate 11 by means of a plurality of machine screws 58. The base member 12 is formed with a pair of spaced parallel laterally extending elongated recesses 59, 60, open to the rear of said base member, within which are disposed helical compression springs 61, 62, respectively. As can be seen in Fig. 2, for example, the slide plate 13 is provided near its rear end with a pair of downwardly extending abutment pins 63, 64 in register with the rear ends of the compression springs 61, 62, respectively, whereby said springs serve to urge said slide plate together with the dead bolt lock 14 attached thereto rearwardly with respect to the base member 12.

A shutter plate 65 attached against the rear end of the base member 12 by means of screws 65a (see Fig. 1) encloses the back of said base member and limits the rearward motion of the slide plate 13.

Figure 5:
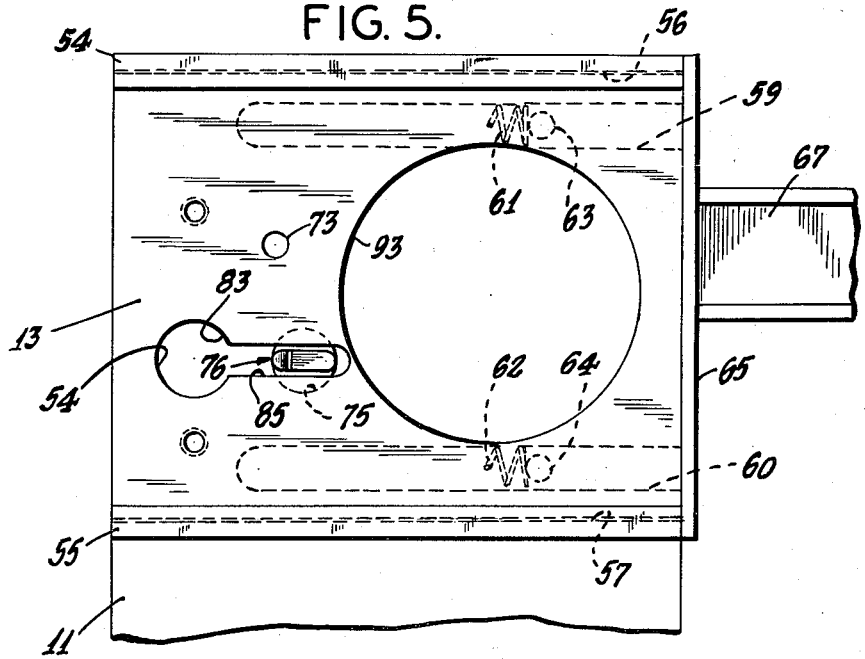
Fig. 5 is a vertical cross-sectional view taken along the line 5—5 of Fig. 2 in the direction of the arrows.

The underside of the base member 12 is formed with a recess 66 within which one end of a channel-shaped strike bar 67 extends through and through an opening in the shutter plate 65, the outer end of said strike bar being fitted with a circular strike plate 67a. The strike bar 67 is fulcrumed within the base member 12 near the rear end thereof by a pin 68. A compression spring 69 (see Fig. 7) within the base member 12 and arranged to abut the inner end of the strike bar 67 serves to normally hold the inner end of said strike bar in its lowermost position whereat it contacts the upper surface of the base plate 11. The strike bar 67 is fitted near its inner end with an upwardly extending adjustable actuating pin 70, which is in axial alignment with the release pin 20 of the dead bolt lock 14 when said lock is in normal position with respect to the base member 12. As illustrated in Fig. 5, the slide plate 13 is provided with an aperture 73 through which the release pin 20 extends. As best illustrated in Fig. 7, the base member 12 is also fitted with a release pin leaf spring 71 secured against the upper surface of the recess 66 therein by means of a pair of machine screws 72. The forward end of the leaf spring 71 terminates at the rearward edge of the aperture 73 and extends angularly upwardly to terminate above the lower end of the actuating pin 70 for the purpose hereinbelow explained.

As best illustrated in Fig. 6, the base member 12 is provided with a longitudinal opening 74 allowing clearance for backward passage of the release pin 20 when the device is actuated for emergency opening by means of the strike bar 67, as will be more fully apparent from the following description. The base member 12 is also formed with a vertically extending cylindrical opening 75 for receiving a cylindrical reset pin 76 (see Fig. 15). As illustrated in Fig. 9, the reset pin 76 is provided in its lower end with a concentric cylindrical opening 77 within which is disposed a compression spring 78 operative to urge said reset pin upwardly of the base member 12. The upper end of the reset pin 76 is formed with front-to-rear downwardly inclined opposed top surfaces 79 and a central upstanding portion 80 formed with a forward upwardly extending abutment portion 81 and a rearwardly directed flat shoulder portion 82.

As illustrated in Fig. 5, the slide plate 13 is provided with an opening having a circular forward portion 83 communicating with a longitudinal rearwardly extending portion 85 which is so positioned and arranged as to straddle the central upstanding portion 80 of the reset pin 76.

As can be seen in Fig. 3, one side of the bolt overlies the top of the headed release pin 20 and this side is provided with a rearwardly extending recess 86 which leaves space for upward movement of said release pin when the device is in its locking position with the bolt extended (see Fig. 7). When the bolt is withdrawn for unlocking the door, however (see Fig. 2), the side wall of said bolt will slide over the headed release pin 20 to prevent its upward movement.

Machine screws 87 extending through the base plate 11 from beneath the base plate 12 are used to secure the safety lock to a door D as illustrated in Fig. 14. A tumbler lock 88 is fitted in the door D for locking or unlocking the safety lock from the outside, said tumbler lock being operable by the same key as operates the inside tumbler lock 50. The rotary barrel of the tumbler lock 88 is provided with an actuating rod 89 of rectangular cross section which extends through aligned openings 90, 91, 92, and 93 in the base plate 11, member 67, piece 66, and plate 13, respectively, to terminate within the space defined by the spaced parallel fork fingers 94, 95 forming part of the outside locking cam 22. When the safety lock is in the locking position, as illustrated in Fig. 4, the actuating rod 89 is coaxial with the neck portion 23 of the outside locking cam 22, whereby said locking cam can be turned by operation of the tumbler lock 88 for actuating the bolt 31 of the safety lock from the outside. When the dead bolt lock 14 of the safety lock is released for emergency exit by actuation of the strike plate 67a, however, and moves away from the door edge along with the slide plate 13, in the manner herein below to be described, the fork fingers 94, 95 of the outside locking cam 22 will slide past the inner end of the actuating rod 89, thereby allowing relative movement. It will be apparent that when the dead bolt lock 14 is in released position, as illustrated in Fig. 8, for example, control of the dead bolt lock 14 will not be possible by means of the outside tumbler lock 88.

When the bolt 31 of the dead bolt lock 14 is in its unlocked position, the release pin 20 is held in its downward position, and cannot be released to effect an emergency unlocking; that is, the lock cannot move back out of its normal position. There will be no need for this movement since the door is actually unlocked. However, when the bolt is in its locked position, the use of the strike plate 67a causes its pin 70 to come into contact with the release pin 20 and raise it above the surface of the base member 12. This raising of the release pin 20 brings into operation the compression springs 61, 62 against the slide plate 13, causing the dead bolt lock 14 to move back for an emergency unlocking.

As described above, the bolt 31 of the dead bolt lock 14, in its locked position, has a recess 86 above the release pin 20. This recess permits the release pin 20 to move upwardly, which in turn causes the dead bolt lock to move back for emergency unlocking.

After emergency use, the dead bolt lock 14 has its bolt 31 extended in a locked position. The entire lock is moved back so that the door D is actually unlocked. In this position, the reset pin 76 goes into operation. It is pushed up by its spring 78 into the dead bolt lock 14 and into the recess 33 of the bolt 31. If an attempt is made to set the lock in its normal operating position, the reset pin 76 acts as an obstruction. The reset of the lock to its normal position is not possible until a person of authority using the proper key K withdraws the bolt into the dead bolt lock 14 to its unlocked position.

When the bolt 31 is retracted to its unlocked position, before the reset pin 20 comes into contact with any obstruction in the bolt, the slide plate 13 forces the reset pin below the base of the dead bolt lock. This permits the dead bolt lock with its slide plate to be pushed back into its normal operating position.

It will be noted that the release pin 20 is being held down by the bolt of the dead bolt lock 14. In order to effect a proper resetting, the release spring 71 comes into play. With the release pin 20 extending downwardly, the pushing of the dead bolt lock 14 into its normal position causes the release pin spring 71 to be forced downwardly by the pin. In its normal position, the release pin rests behind the release pin spring. The release pin spring 71 acts as a retainer for the dead bolt lock 14 in opposition to the compression springs 61, 62 which act against the slide plate 13.

In emergency use, the release pin 20 is pushed up above the release pin spring 71. This releases any opposition to the operation of the compression springs 61, 62, allowing the slide plate 13 in the dead bolt lock 14 to move backwardly away from the edge of the door, thereby unlocking it.

While only one form of the invention is described herein, it is to be understood that this form is presented by way of example only, and that the invention is not to be limited thereto, but may be modified and embodied in various other equivalent forms without departing from its spirit. In short, the invention includes all the modifications and embodiments coming within the scope of the appended claims.

What is claimed is new and for which it is desired to obtain Letters Patent is:

1. In an emergency exit door lock, the combination comprising a bolt lock casing, a bolt therein, a key-operated mechanism on the bolt lock casing for projecting and retracting the bolt relative to said bolt lock casing into and away from locking position respectively, a base member, means slidably mounting said bolt lock casing on said base member, resilient means operating between said bolt lock casing and said base member for urging said bolt lock casing from a normal locking position on said base member in the direction opposite to the projecting direction of the bolt thereof, to a release position thereon, releasable means to normally retain said bolt lock casing at said locking position with respect to said base member, and manually operable strike plate means for releasing said bolt lock casing retaining means to permit said resilient means to move said bolt lock casing to said release position with respect to said base member.

2. In an emergency exit door lock, the combination comprising a bolt lock casing, a bolt therein, a key-operated mechanism for extending and withdrawing the bolt relative to said bolt lock casing into and away from locking position, a base member, means slidably mounting said bolt lock casing on said base member, resilient means operating between said bolt lock casing and said base member for urging said bolt lock casing from a locking position on said base member in the direction opposite to the extending direction of the bolt thereof to a release position thereon, releasable means to normally retain said bolt lock casing at said locking position with respect to said base member, and manually operable strike plate means for releasing said bolt lock casing retaining means for moving said bolt lock casing to said release position with respect to said base member, and means rendering said strike plate releasing means inoperative when said bolt is withdrawn in said bolt lock.

3. In an emergency exit door lock, the combination comprising a bolt lock casing, a bolt therein, key-operated mechanism for extending and withdrawing the bolt relative to said bolt lock casing into and away from locking position, a base member, means slidably mounting said bolt lock casing on said base member, resilient means operating between said bolt lock casing and said base member for urging said bolt lock casing from a locking position on said base member in the direction opposite to the extending direction of the bolt thereof to a release position thereon, releasable means to normally retain said bolt lock casing at said locking position with respect to said base member, and manually operable strike plate means for releasing said bolt lock casing retaining means for moving said bolt lock casing to said release position with respect to said base member, and means preventing return movement of said bolt lock casing from said release position to said locking position on said base plate unless the bolt is in withdrawn position within said bolt lock casing.

4. In a panic lock, the combination comprising, a dead bolt lock comprising a casing, a bolt therein, key-operated mechanism on the casing for extending and withdrawing the bolt relative to the casing into and away from locking position, a base member, a slide plate slidably arranged upon said base member, said dead bolt lock casing being fixedly mounted on said slide plate, spring means operative to urge said slide plate and casing from a locking position of said dead bolt lock casing with respect to said base member in a direction opposite to the extending direction of said bolt to a release position with respect to said base member, releasable means normally retaining said dead bolt lock casing at said locking position with respect to base member, and a strike member movably connected with respect to said base member and operable to release said dead bolt lock casing retaining means for moving said slide plate and said dead bolt lock casing to said release position with respect to said base member.

5. In a panic lock, the combination comprising, a dead bolt lock comprising a casing, a bolt therein, key-operated mechanism for extending and withdrawing the bolt relative to the casing into and away from locking position, a base member, a slide plate slidably arranged upon said base member, said dead bolt lock casing being fixedly mounted on said slide plate, spring means operative to urge said slide plate and casing from a locking position of said dead bolt lock casing with respect to said base member in a direction opposite to the extending direction of said bolt to a release position with respect to said base member, releasable means normally retaining said dead bolt lock casing at said locking position with respect to base member, a strike member movably connected with respect to said base member and operable to release said dead bolt lock casing retaining means for moving said slide plate and said dead bolt lock casing to said release position with respect to said base member, and means rendering said strike member inoperative when said bolt is withdrawn in said bolt lock casing.

6. In a panic lock, the combination comprising, a dead bolt lock, key-operated mechanism on the bolt lock for extending and withdrawing the bolt thereof into and away from locking position, a base member, a slide plate slidably arranged upon said base member, said dead bolt lock being fixedly mounted on said slide plate, spring means operative to urge said slide plate from a locking position of said dead bolt lock with respect to said base member in a direction opposite to the extending direction of said bolt to a release position with respect to said base member, releasable means normally retaining said dead bolt lock at said locking position with respect to base member, a strike member movably connected with respect to said base member and operable to release said dead bolt lock retaining means for moving said slide plate and said dead bolt lock to said release position with respect to said base member, and means preventing return movement of said bolt lock from said release position to said locking position on said base plate unless the bolt of said bolt lock is in withdrawn position.

7. In a panic lock, the combination comprising, a dead bolt lock, key-operated mechanism thereon for extending and withdrawing the bolt thereof into and away from locking position, a base member, a slide plate slidably arranged upon said base member, said dead bolt lock being fixedly mounted on said slide plate, spring means operative to urge said slide plate from a locking position of said dead bolt lock with respect to said base member in a direction opposite to the extending direction of said bolt to a release position with respect to said base member, releasable means normally retaining said dead bolt lock at said locking position with respect to base member, a strike member movably connected with respect to said base member and operable to release said dead bolt lock retaining means for moving said slide plate and said dead bolt lock to said release position with respect to said base member, means rendering said strike member inoperative when said bolt is withdrawn in said bolt lock, and means preventing return movement of said bolt lock from said release position to said locking position on said base plate unless the bolt of said bolt lock is in withdrawn position.

8. The panic lock as defined in claim 4 wherein said spring means comprises a pair of helical compression springs arranged in spaced parallel relation in said base member and extending in the direction of sliding of said slide plate with respect to said base member.

9. The panic lock as defined in claim 4 wherein said releasable retaining means comprises a release pin extending slidably through openings in said dead bolt lock and said slide plate and into a recess in said base member, and resilient means in said base member operative to abut an extending end of said release pin.

10. The panic lock as defined in claim 9 wherein said strike member comprises a lever pivotally mounted in said base member and extending outwardly thereof, and having an abutment pin aligned with said release pin and operative, when said lever is actuated, to push said release pin out of range of said resilient abutment means for releasing the slide plate and dead bolt lock.

11. The panic lock as defined in claim 10 wherein said resilient abutment means comprises a leaf spring.

12. The panic lock as defined in claim 10 in combination with means rendering said strike plate releasing means inoperative said last means comprising a mechanism on said bolt preventing sliding movement of said release pin into said dead bolt lock.

13. The panic lock as defined in claim 7 wherein said return movement preventing means comprises a cylindrical reset pin slidably mounted in an opening in said base member, means for urging said reset pin upwardly to project upwardly through openings in said slide plate and said dead bolt lock, said dead bolt lock, when extended, having an abutment portion contacting the upwardly projecting portion of said reset pin to prevent movement of said dead bolt lock and slide plate into the locking position without the bolt first being withdrawn by said dead bolt lock key.

14. The invention as defined in claim 13 including means to withdraw said reset pin into said base member upon movement of said dead bolt lock back into locking position.

15. The invention as defined in claim 14 including key controlled lock means for operating said dead bolt lock through the rear side of said base member for key control from the outside of a door.

16. In combination, a lock casing, means to mount the lock casing on a door for movement relative to said door, from an operative position to an inoperative position, a bolt movably mounted within the casing, manually actuable means mounted on the lock casing, and engageable with the bolt, to project and retract the bolt relative to the casing, and means to move the casing and bolt together relative to the mounting means for said casing from operative position to inoperative position.

17. The combination of claim 16, said means for moving the casing relative to the door mounting means from operative to inoperative position, comprising spring means, releasable means to retain said casing in operative position against movement by said spring means, and manual means to actuate the releasable means to permit the spring means to move said casing from operative to inoperative position.

18. The combination of claim 17, in combination with means to prevent movement of the casing from inoperative position to operative position after the spring means have moved the casing from operative to inoperative position, upon release of the retaining means by actuation of said manual means.

19. The combination of claim 18, the means for projecting and retracting the bolt comprising key actuated means actuable from one side of the casing for either projecting or retracting the bolt, with said casing in either operative or inoperative position, and key actuated means operable from the opposite side of said casing operable to project or retract said bolt only when said casing is in operative position.

20. The combination of claim 19, and means actuable upon retracting the bolt into the casing when the casing is in inoperative position to render the retaining means inoperative so that the casing may be manually moved back from inoperative to operative position.

21. In combination, a lock comprising a base adapted to be fixed to the inside of a door adjacent one edge thereof, a lock casing mounted on the base for movement toward and away from said edge, spring means to move the casing in one direction away from normal position at said edge, releasable latch means to retain said casing in said normal position on said base, a bolt in the casing, manually actuable means mounted on the casing and engageable with the bolt, to project and retract the bolt relative to said casing when the latter is in said normal position, to engage and disengage a strike on a door jamb, and adjacent said edge, and manual means to release said latch means to permit said spring means to move said casing and projected bolt away from said normal position on said base, to disengage the projected bolt from the strike.

22. In combination, a lock comprising a base adapted to be fixed to the inside of a door adjacent one edge thereof, a lock casing slidable on the base for movement toward and away from said edge, spring means to slidably move the casing in one direction away from normal position at said edge, releasable latch means to retain said casing in said normal position on said base, a bolt in said casing, means on the casing to project and retract the bolt relative to said casing when the latter is in said normal position, to engage and disengage a strike on a door jamb, and adjacent said edge, manual means to release said latch means to permit said spring means to move said casing and projected bolt away from said normal position on said base, to disengage the projected bolt from the strike, and means to prevent said casing from being moved back to normal position unless the bolt is first retracted by said bolt retracting means, relative to the casing with the casing positioned away from normal position.

23. In combination, a lock comprising a base adapted to be fixed to the inside of a door adjacent one edge thereof, a lock casing slidable on the base for movement toward and away from said edge, spring means to slidably move the casing in one direction away from normal position at said edge, releasable latch means to retain said casing in said normal position on said base, a bolt in said casing, means on the casing to project and retract the bolt relative to said casing when the latter is in said normal position, to engage and disengage a strike on a door jamb, and adjacent said edge, manual means to release said latch means to permit said spring means to move said casing and projected bolt away from said normal position on said base, to disengage the projected bolt from the strike, said means to project and retract the bolt comprising key operated means on the casing, operable from the inside of the door in the normal position of the casing and also in the position of the casing moved away from normal, to project and retract the bolt.

24. The combination of claim 23, said means to project and retract the bolt also comprising key operated means operable from the outside of the door to project and retract the bolt, only with the casing in normal position and being inoperable to project or retract the bolt in the position of the casing away from said normal position.

25. The combination of claim 21, said means to release the latch means comprising a member movably mounted on the base and having an exposed strike plate at the inside of the door adapted to be struck manually to move said member to release the latch means.

References Cited in the file of this patent

UNITED STATES PATENTS

| | | |
|---|---|---|
| 2,607,313 | Eads | Aug. 19, 1952 |
| 2,696,099 | Uher | Dec. 7, 1954 |
| 2,789,527 | Davis | Apr. 23, 1957 |

FOREIGN PATENTS

| | | |
|---|---|---|
| 103,785 | Austria | July 26, 1926 |
| 313,489 | Germany | July 14, 1919 |